United States Patent [19]
Lynn et al.

[11] Patent Number: 5,529,589
[45] Date of Patent: Jun. 25, 1996

[54] FIBER MEDIA BLASTING MATERIAL, METHOD OF RECYCLING SAME, AND EQUIPMENT FOR DISCHARGING SAME

[75] Inventors: William R. Lynn, Dover; Wilfred P. Parent, Milton; Jade D. Fogg, Lee; Troy L. Fogg, Durham; Mary McEwan, Dover, all of N.H.

[73] Assignee: Technology Trust Inc., Dover, N.H.

[21] Appl. No.: 300,443

[22] Filed: Sep. 2, 1994

[51] Int. Cl.⁶ ......................................................... B24D 3/00
[52] U.S. Cl. .................................. 51/293; 51/295; 134/7; 134/10
[58] Field of Search ........................... 51/295, 293; 451/2, 451/3, 36, 38, 39, 80, 87, 89, 99; 15/300.1, 302, 320, 321; 134/7, 10

[56] References Cited

U.S. PATENT DOCUMENTS

| | | | |
|---|---|---|---|
| 1,444,648 | 2/1923 | Willis et al. | 406/56 |
| 1,559,666 | 11/1925 | Bernier | 366/11 |
| 1,752,956 | 4/1930 | Lex | 222/633 |
| 2,426,072 | 8/1947 | Wall et al. | 451/39 |
| 2,597,434 | 5/1952 | Bishop et al. | 451/3 |
| 2,624,988 | 1/1953 | Vander Wal | 451/39 |
| 2,652,662 | 9/1953 | Newell | 451/38 |
| 2,910,812 | 11/1959 | Brunner | 451/39 |
| 3,313,067 | 4/1967 | Smith et al. | 451/39 |
| 3,461,478 | 8/1969 | Taylor | 15/302 |
| 3,521,407 | 7/1970 | Nalley et al. | 451/2 |
| 3,634,973 | 1/1972 | McCarty | 451/36 |
| 3,716,066 | 2/1973 | Currier et al. | 134/7 |
| 4,158,576 | 6/1979 | Butz | 134/7 |
| 4,439,073 | 3/1984 | White | 406/125 |
| 4,534,139 | 8/1985 | Desjardins | 451/101 |
| 4,545,155 | 10/1985 | Nakata | 451/39 |
| 4,589,234 | 5/1986 | Rebham et al. | 451/80 |
| 4,666,465 | 5/1987 | Matsumato et al. | 51/293 |
| 4,729,770 | 3/1988 | Higgins | 51/293 |
| 4,731,125 | 3/1988 | Carr | 134/17 |
| 4,827,678 | 5/1989 | MacMillan et al. | 451/39 |
| 4,832,706 | 5/1989 | Yates | 51/293 |
| 4,970,830 | 11/1990 | Schlick | 451/99 |
| 5,024,029 | 6/1991 | Abbott et al. | 451/101 |
| 5,049,166 | 9/1991 | Kirkendall | 51/293 |
| 5,146,716 | 9/1992 | Lynn | 451/39 |

FOREIGN PATENT DOCUMENTS

| | | |
|---|---|---|
| 0874693 | 4/1953 | Germany . |
| 2717287 | 10/1978 | Germany . |
| 2840029 | 11/1979 | Germany . |
| 816363 | 7/1959 | United Kingdom . |

*Primary Examiner*—Deborah Jones
*Attorney, Agent, or Firm*—Davis, Bujold & Streck

[57] ABSTRACT

The invention relates to an improved blasting media which has a lattice fiber structure which is used as a carrier for other desired components. Desired abrasive component(s), polishing component(s) and/or absorptive component(s) are attached to the strands of the carrier components in order to form a plurality of individual, discrete granules which are readily propellable by conventional blasting equipment against the surface to be treated. The latticed fiber carrier component has improved integrity over prior art media carriers as it is not prone to readily break down during use and thereby facilitates regeneration of the blasting media once the effectiveness of the media has been substantially reduced. The invention also relates to an improvement in equipment for propelling the blasting media against a desired surface, the addition of vapor to the blasting media to the minimize the generation of dust, upon the media impacting a surface to be cleaned, and a method of regenerating the blasting media once its effectiveness has been substantially reduced.

21 Claims, 5 Drawing Sheets

FIBER MEDIA BLASTING MATERIAL, METHOD OF RECYCLING SAME, AND EQUIPMENT FOR DISCHARGING SAME

FIELD OF THE INVENTION

This invention relates to an improved blasting media and, in particular, a fiber media blasting material comprising a fibrous carrier component having at least one of an abrasive component(s), a polishing component(s) and/or an absorptive component(s) securely attached or bonded to desired areas of the carrier component. The invention also relates to a method of regenerating the fiber media, when its effectiveness has been substantially reduced, an improved apparatus for propelling the fiber media against a desired surface to be treated, and an arrangement for reducing the generation of dust upon propelling the blasting media against the desired surface.

BACKGROUND OF THE INVENTION

A known prior art composite blasting media is disclosed in U.S. Pat. No. 5,234,470 issued to William R. Lynn and Wilfred Paul Parent. The disclosed composite media is designed so that the carrier component wears, during use, as the abrasive material disintegrates thereby exposing additional underlying abrasive component for treating the surface. A major drawback associated with this composite media is that both the carrier component and the abrasive component are consumed during blasting. Further, the wearing and/or consumption of the carrier component increases the waste associated with use of this known blasting media.

SUMMARY OF THE INVENTION

Wherefore, it is an object of the present invention to overcome the aforementioned problems and associated drawbacks of known prior art blasting media.

Another object of the invention is to form a cleaning/stripping media that can be used with vapor so that the dust created during use of the blasting media is minimized while the media's cleaning/degreasing effectiveness is maximized.

A further object of the invention is to form a media that has sufficiently less rebound energy than conventional medias, upon impacting a surface being treated, thereby facilitating collection of the media for further use and/or regeneration.

A still further object of the invention is to utilize a carrier component having greater strength and integrity than other composite medias so that the carrier component remains substantially intact after numerous blasting cycles.

Another object of the invention is to form a media which has an increased porosity then prior art medias so that the media has increased flowability through blasting equipment while, at the same time, minimizing the ability of the media to bridge and/or compact within the blasting equipment.

Still another object of the invention is provide a blasting media which can be custom blended so as to have desired blasting and/or surface treating characteristics, by varying the amount and/or type of the abrasive, the polishing and/or the absorptive components combined with the fibrous carrier component.

Another object of the invention is to provide a blasting media in which the carrier component does not readily dissinegrate or breakdown, during use, so as to facilitate regeneration and/or rebuilding of the fiber media.

A further object of the invention is to provide a media which facilitates on site recycling, rebuilding, regenerating, recombining, reusing and/or repairing of the blasting media.

Yet another object of the invention is to provide a method of collecting, screening, sifting and/or separating of the used blasting media from the debris and other contaminants and to clean and recycle the blasting media to produce/regenerate the blasting media containing additional abrasive, polishing and/or absorptive components.

Still another object of the invention is facilitate the addition of a liquid or solid substance or a bacteria or fungus to the fiber media to assist the media with treating a desired surface and/or decomposing absorbed contaminants and debris over a desired period of time. Such substance, bacteria or fungus is typically added to the media immediately prior to use.

The present invention relates to a solid, granulated fiber blasting media comprising a plurality of individual discrete granulated particles for use in treating a surface to remove undesired contaminants therefrom, each discrete granulated particle of said media comprising a carrier component having a lattice structure formed by a plurality of interconnected fibrous strands; a plurality of discrete particles of at least one of an abrasive and a polishing component; an adhesive component, being carried by said carrier component, to attach said plurality of discrete particles of at least one of the abrasive and the polishing component to said carrier component; and said lattice structure facilitating contact of said plurality of discrete particles of at least one of the abrasive and the polishing component with a surface to be treated while resisting wear of said carrier component, during use, so that said carrier component remains substantially in tact after numerous blasting cycles thereby facilitating reuse of said carrier component.

The present invention also relates to a method of forming a solid, granulated fiber blasting media comprising a plurality of individual discrete granulated particles for use in treating a surface to remove undesired contaminants therefrom, said method comprising the steps of utilizing a carrier component having a lattice structure comprising a plurality of interconnected strands of fibrous material; applying an adhesive component to said carrier component; attaching, via said adhesive component carried by said carrier component, a plurality of discrete particles of at least one of an abrasive and a polishing component to said carrier component thereby forming a plurality of fiber media particles each having a plurality of discrete particles of at least one of the abrasive and the polishing component attached to said carrier component whereby said lattice structure facilitates contact of said plurality of discrete particles of at least one of the abrasive and the polishing component with a surface to be treated while resisting wear of said carrier component, during use, so that said carrier component remains substantially in tact after numerous blasting cycles thereby facilitating reuse of said carrier component.

The present invention relates to a method of recycling a fiber blasting media, comprising a plurality of discrete granules which each contain a plurality of discrete particles of at least one of an abrasive and a polishing component being attached to a carrier component by an adhesive component, after said media is propelled through blasting equipment and said media's effectiveness is reduced, said method comprising the steps of collecting the fiber blasting media, having a lattice structure, after at least one blasting cycle; adding at least one of additional adhesive component, additional abrasive component, additional polishing component and additional carrier component to the collected fiber media; and forming the mixture of the collected fibrous blasting media and said at least one of the additional adhesive component, abrasive component, polishing component and carrier component into a plurality of granules each containing a plurality of discrete particles of at least one of the abrasive and the polishing component attached to said carrier component by said adhesive component so that said lattice structure facilitates contact of said plurality of discrete particles of at least one of the abrasive and the polishing component with a surface to be treated while resisting wear of said carrier component, during use, so that said carrier component remains substantially in tact after numerous blasting cycles thereby facilitating reuse of said carrier component.

The present invention also relates to a blasting device, suitable for discharging a fiber blasting media against a surface to achieve a desired surface treatment, said blasting device comprising a) a storage container, having an outlet, for containing a supply of pliant particulate blasting media; b) a discharge conduit having nozzle means connected to a first end thereof; c) a media feed mechanism, connecting the outlet of said storage container to a second end of the discharge conduit remote from said nozzle means, for supplying a desired quantity of blasting media from said storage container to the second end of said discharge conduit, said media feed mechanism facilitating positively conveyance of said blasting media into a flow of pressurized fluid in said discharge conduit to provide a continuous supply of blasting media to said nozzle means; d) a fluid supply mechanism connected adjacent the second end of said discharge conduit for supplying the flow of pressurized fluid thereto; e) a moisture supply mechanism for supplying moisture to said blasting media and the flow of pressurized fluid to minimize generation of dust created during use of the blasting media while maximizing the cleaning and degreasing effectiveness of the media.

Finally, the invention relates to a method of reducing dust generated upon blasting media conveyed by blasting equipment impinging against a desired surface, said method comprising the steps of utilizing media having a carrier component with a lattice structure comprising a plurality of interconnected strands of a fibrous material, and a plurality of discrete particles of at least one of an abrasive and a polishing component being attached to said carrier component by an adhesive component carried by said carrier component thereby forming a plurality of fibrous blasting media particles each having a plurality of discrete particles of at least one of the abrasive and the polishing component attached to said carrier component; adding moisture to said blasting media; and propelling said mixture of blasting media and moisture, via the blasting equipment, against a desired surface thereby reducing the generation of dust created upon said blasting media impinging against the desired surface.

These and other objects of the invention will be better understood, by one skilled in the art, by having reference to the appended drawings and following description.

BRIEF DESCRIPTION OF THE DRAWINGS.

The invention will now be described, by way of example, with reference to the accompanying drawings in which.

DESCRIPTION OF THE PREFERRED EMBODIMENTS

Turning now to FIGS. 1–4, a detailed description of the present invention will now be provided. The fiber media 2, according to the present invention, comprises a fibrous support or carrier material or component 4 having a plurality of abrasive component(s) 6, polishing component(s) 8 and/or absorbent component(s) 10 components (FIGS. 3 and 4) securely bonded or fastened thereto at desired areas of the carrier material 4 by a suitable adhesive, resin, binder or the like 11. The components bonded or fastened to the carrier component 4 are typically secured at the intersection or bonding locations of two or more of fiber strands 13 forming the lattice structure of the carrier component. It is to be appreciated, however, that the material to be bonded or fastened to the carrier component may be secured at any location along a length of each fiber forming the carrier component structure.

Figure 3:
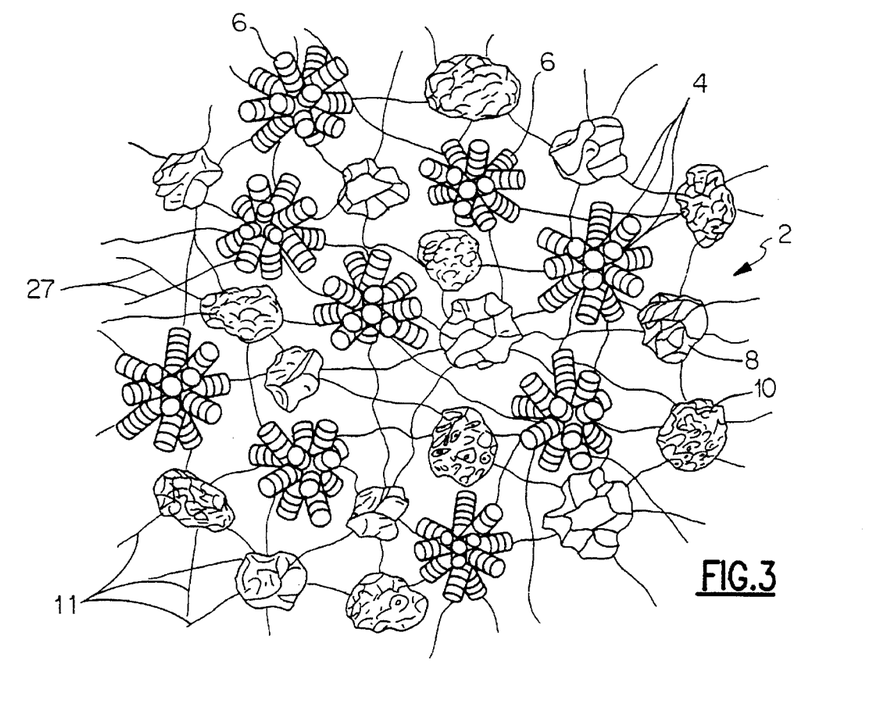
FIG. 3 is a diagrammatic drawing of a partial cross sectional view of a second embodiment of a portion of a fiber media particle according to the present invention.

As can be seen in FIG. 3, each fiber media particle can combine with a plurality of different abrasive component(s) 6, polishing component(s) 8, and/or absorptive component(s) 10 so that each fiber media particle 3 can be customized for any specific blasting application and thereby readily achieve a quick and an effective treatment of a desired surface. For example, if the removal of paint from a metal surface is desired, each fiber media particle 3 may contain a desired mixture of an abrasive component(s) and a polishing component(s) so that paint is efficiently and effectively removed from the surface by the abrasive component(s) 6 while the surface is polished, during the same blasting cycle, by the polishing component(s) 8. A suitable mixture for such application is 70% of an abrasive component such as steel grit and 30% of a polishing component such as walnut. It is to be appreciated that the operator utilizing the media, according to the present invention, has the ability to vary the amounts and type of the abrasive and/or polishing component(s) to achieve desired stripping and/or polishing of the surface during use of the media.

Figure 1:
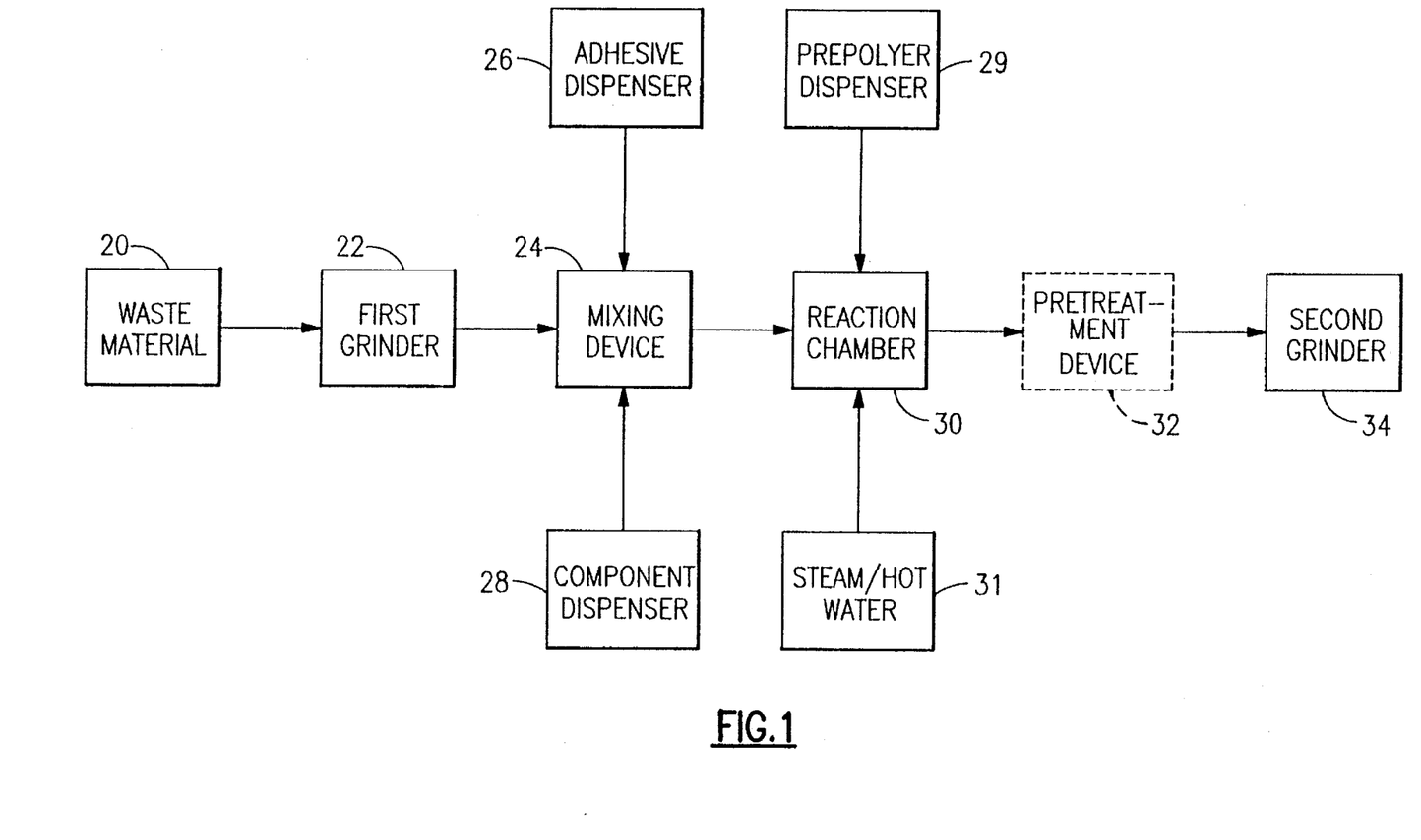
FIG. 1 is a block diagrammatic drawing showing the steps for manufacturing the improved fiber media according to the present invention.
Figure 2:
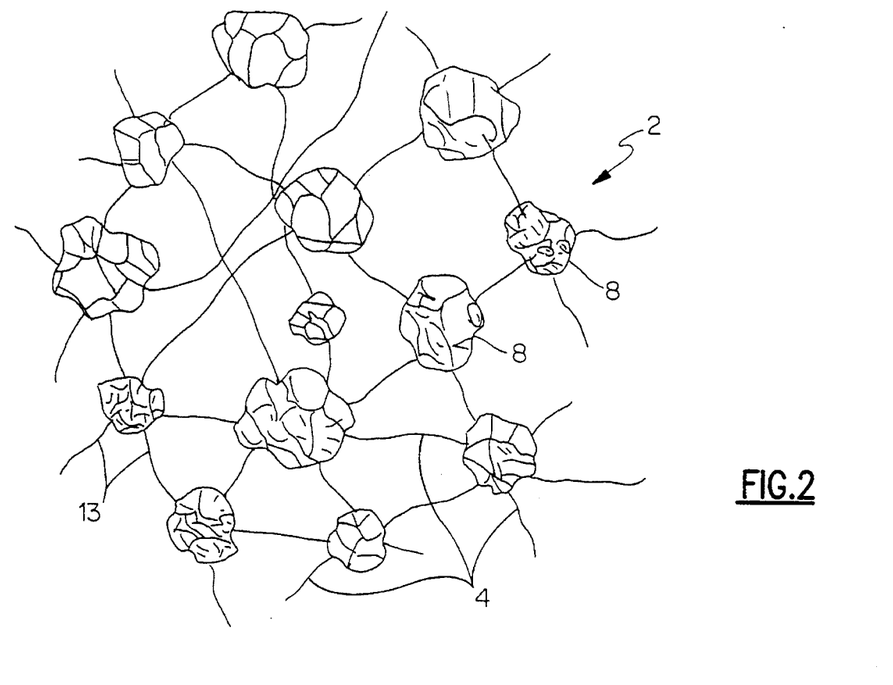
FIG. 2 is a diagrammatic drawing of a partial cross sectional view of a portion of a fiber media particle according to the present invention.
Figure 8:
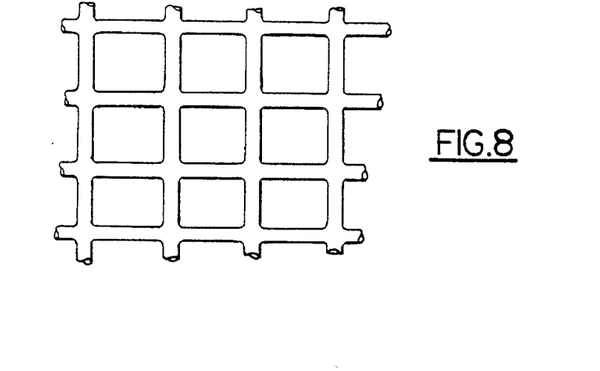
FIG. 8 is a partial diagrammatic diagram showing a first embodiment (planar) of the lattice carrier component.

With reference to FIG. 1, the method of manufacturing the fiber media 2, according to the present invention, will now be described in detail. A waste product or material 20 (FIG.

8), for example a by product from the die cutting of fibrous packaging material manufactured by Foamex of Eddystones, Pa. is placed in or conveyed to a suitable first grinder 22, such as a grinder manufactured by Nelmor Plastic Machinery of Nexbridge, Mass. (Model #G1012M1). The waste product 20 is ground up by the first grinder 22 into a plurality of fibrous particles ranging in length from approximately ¼" (0.635 mm) to ⅛" (0.318 mm), if desired, some particles may be somewhat larger in size. It is to be appreciated that the overall shape and dimension of the ground up particles is not critical as long as the particles are sufficiently large in size to facilitate attachment or bonding of desired abrasive component(s) 6, polishing component(s) 8 and/or absorptive component(s) 10 thereto.

The ground fibrous material is then conveyed to a mixing device 24, such as a ribbon blender manufactured by Munnson Machinery Co. of Utica, N.Y. The ground fibrous material is combined (e.g. sprayed) with an adhesive binder 11, supplied by an adhesive dispenser 26. One suitable binder is supplied under the tradename A-16 by Praco of St. Charles, Mich. The inventors also determined that a plurality of other suitable adhesives such as those manufactured by GenCorp Polymer Labs of Akron, Ohio are also acceptable for attaching the desired components to the carrier component. Another suitable adhesive is a 4550 spray adhesive/binding agent manufactured by Minnesota Mining and Manufacturing Co. of St. Paul, Minn.

Once the ground fibrous material and the applied adhesive 11 are thoroughly mixed with one another and the adhesive becomes sufficiently tacky, after a retention period, a desired quantity and/or combination of the abrasive component(s) 6 and/or the polishing component(s) 8 are conveyed to the mixing device 24 by a component dispenser 28. This mixture is then mixed and allowed to set for a predetermined period of time, e.g. a few seconds to three (3) minutes, depending upon the components.

It is to be appreciated that the abrasive component(s) 6 and the polishing component(s) 8 can be mixed and dispensed together or dispensed separately from one another by separate component dispensers 28. Further, depending upon the application of the media, only an abrasive component(s) or a polishing component(s) may be added to the mixing device 24 by the component dispenser 28. Lastly, the added abrasive component(s) 6 or polishing component(s) 8 can be a blend of two or more different abrasive or polishing components. As a variety of known devices and/or mechanisms are suitable for dispensing the binder and the abrasive and/or polishing components, a further detailed discussion concerning the same is not provided herein.

Figures 4, 9:
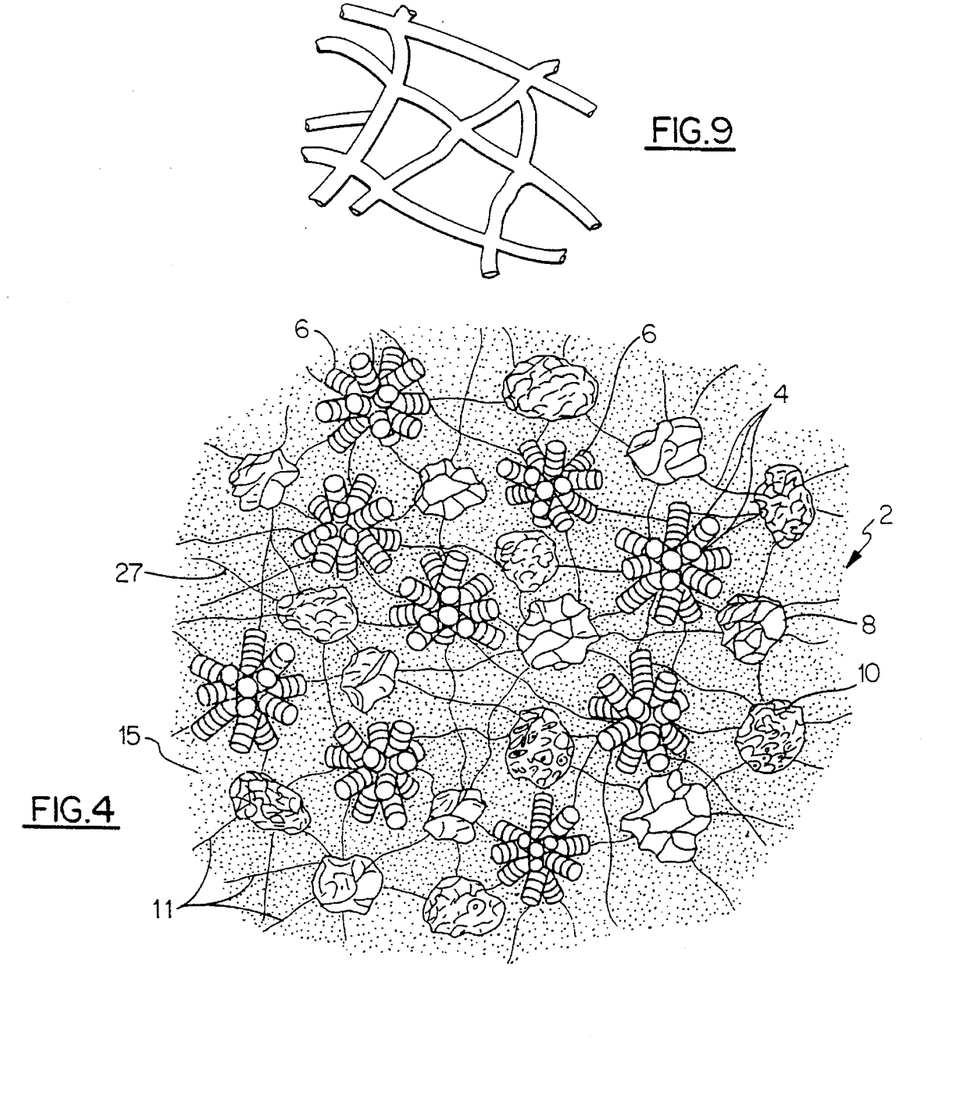
FIG. 4 is a diagrammatic drawing of a partial cross sectional view of a third embodiment of a portion of a fiber media particle according to the present invention.
FIG. 9 is a partial diagrammatic drawing showing a second embodiment (3 dimensional) of the lattice carrier component.

If it is desirable for the fiber media 2 to be slightly softer or more absorbent, a prepolymer, such as CUPOL manufactured by Matrix Inc. of Dover, N.H. or a number of MDI base prepolymers, with added strengtheners, manufactured by GenCorp Polymer Labs of Akron, Ohio, can be added to the mixed components by a prepolymer dispenser 29 and reacted with steam and/or hot water supplied by a vapor dispenser 31. The above referred to prepolymers are moisture activated materials so that when the prepolymer is exposed to steam and/or hot water, the moisture functions as a catalyst and speeds up the reaction of the prepolymer with the fibrous carrier component 4 and the added components 6, 8, 10 to form a plurality of fiber media particles each incorporating a substantially uniformed mixture of the ground carrier component 4, the abrasive component(s) 6, the polishing component(s) 8, the absorptive component(s) 10 and/or the prepolymer 15 (FIG. 4). The mixture is thereafter allowed to react for a necessary period of time, e.g. a few minutes, depending on the type of the prepolymer employed and/or the amount of steam. Typically, the prepolymer will be allowed to react for a few seconds to about four (4) minutes. As the reaction time for various known prepolymers will be readily apparent to one skilled in the art, a further detailed description concerning the same is not provided herein. Finally, the mixture is conveyed to and processed by a second grinder (particle sizer) 34 such as a SCC Rotary Cutting Device manufactured by Munnson Machinery of Utica, N.Y. The prepolymer typically fills and occupies the space between adjacent abrasive component(s) 6, polishing component(s) 8 and/or absorptive component(s) 10 of each particle and is bonded or otherwise attached to such components to form a unitary structure.

An important feature of the fibrous carrier material 4, of the present invention, is that the fibrous material comprises a plurality of strands, threads and the like which are interwoven, intermeshed, and/or attached with one another to form an open lattice support structure. The fibrous carrier material 4, due to its lattice structure, is very porous and this tends to increase the flowability of the formed fiber media 2 through suitable blasting equipment. The lattice structure also tends to space the abrasive component(s) 6, the polishing component(s) 8 and absorptive component(s) 10 from one another (see FIGS. 2 and 3). The inventors have discovered that a variety of different materials, having a lattice structure similar to that shown in FIGS. 2–4 and 8, function very well as the carrier component. The inventors have also determined that the fiber's lattice structure does not readily break down, upon impacting the surface being cleaned, while still facilitating attachment of the abrasive component(s) 6, the polishing component(s) 8 and/or the absorptive component(s) 10 the carrier component. Thus, the lattice structure remains substantially intact, after a plurality of blasting cycles, and this facilitates regeneration or rebuilding of the fiber media while, at the same time, minimizes the amount of fiber waste generated by using the fiber media according to the present invention.

A variety of known fibrous materials, which have a suitable lattice structure, are presently available for attaching the abrasive component(s) 6, the polishing component(s) 8, and/or the absorptive component(s) 10 thereto. The inventors have found that a lattice structure made from urethane or nylon polypropylene work well. In addition, a variety of known abrasive components are presently available, for example, sand, walnut shell, steel grit, garnet, aluminum oxide, ground glass or STAROLITE®; a variety of known polishing components are presently available, for example, walnut shell, corn cob, or pumice; and a variety of known absorptive components are presently available, for example, an open or closed cell foam, various prepolymers, cotton fiber, cellulose, peat moss, or corn cob.

The fiber media, according to the present invention, allows an operator to custom blend the media to achieve desired surface treatment characteristics. For example, a number of abrasive components can be combined with a polishing and/or an absorptive material. The operator is able to select and blend suitable components together to achieve desired surface treatment during a minimum number of blasting cycles, e.g. one or a few blasting cycles. If desired, the fiber media 2 may be pretreated, e.g. soaked or sprayed, in a pretreatment device 32, with a grease cutting solution or some other surface cleaning or treating chemical or composition to assist the blasting media with treating the desired surface. The density of the fiber media, according to the present invention, can be easily varied by appropriate selection of the abrasive component(s) 6, the polishing component(s) 8, the absorptive component(s) 10 and/or the carrier component 4.

The porosity of the fibrous carrier material 4 facilitates adhesion and/or bonding of the abrasive component(s) 6, the polishing component(s) 8 and/or the absorptive component(s) 10 to the carrier component 4 and promotes uniformed dispersion of the various components within the fibrous carrier material. These bonded components increase the density of the media. The components 6, 8, 10 carried on the periphery of each fiber media particle 2 are located for direct contact with the surface to be treated S. Due to the resilience of lattice structure of the fibrous carrier components 4, the components 6, 8, 10 located in the middle or central region of the lattice structure are able to contact the surface being treated S as the fiber media particle 2 compresses and flattens out upon impacting the surface being cleaned. The above and other characteristics of the fiber media 2, according to the present invention, result in a media which has improved cutting rate (e.g. a deeper and a quicker cleaning and/or abrasion of the surface being cleaned) over known prior art blasting media.

The carrier component 4 may be two dimensional, e.g. planar (FIG. 8), or may be a three dimensional structure, (FIG. 9). In addition, the lattice structure may have a uniform repeating pattern, similar to a screen, or may have an arbitrary or random arrangement of interconnected fibers.

Figures 5, 6:
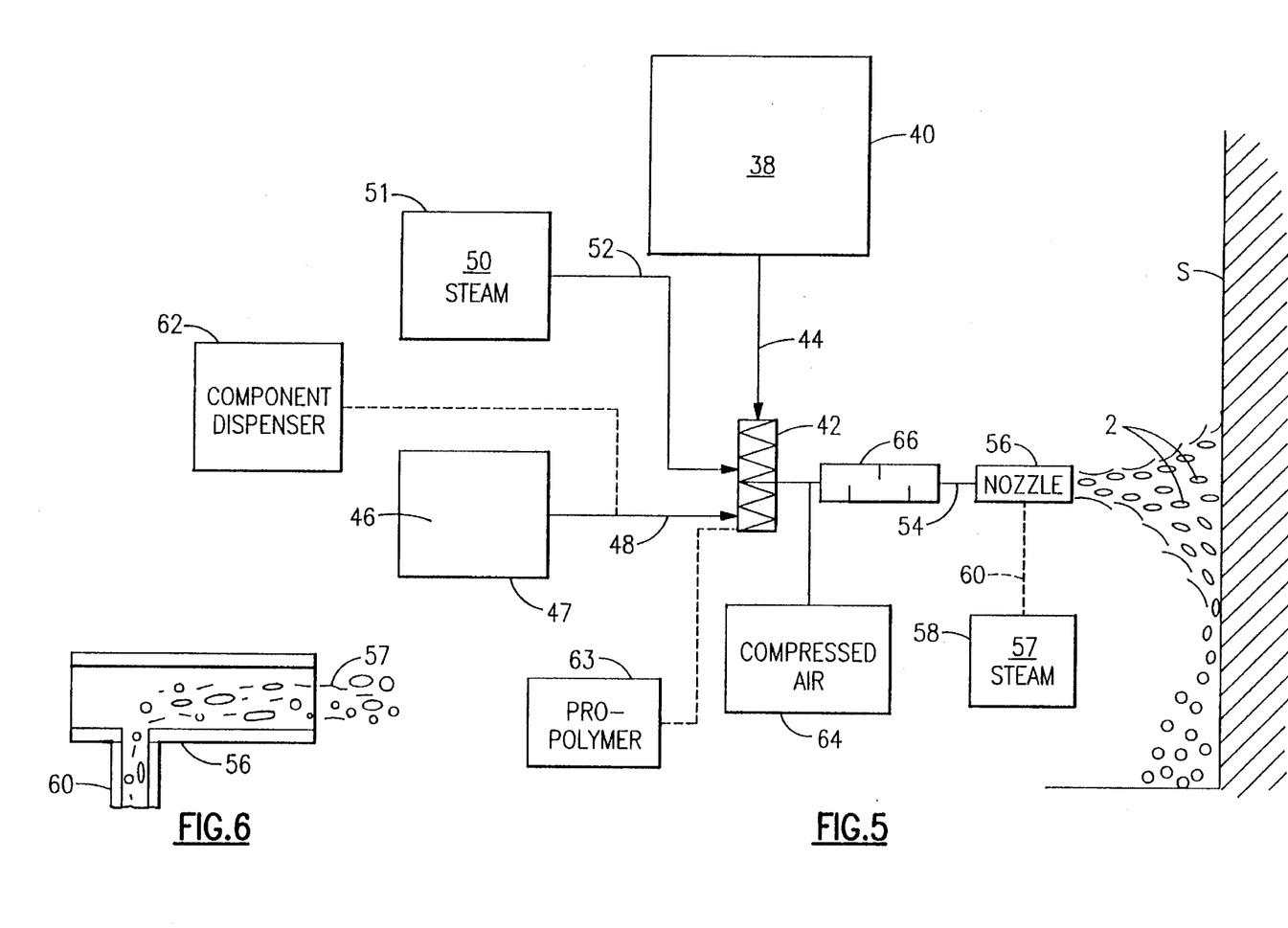
FIG. 5 is a diagrammatic drawing showing an improved blasting apparatus for conveying the fiber media according to the present invention.
FIG. 6 is a diagrammatic drawing showing a discharge nozzle for blasting composite media, according to the present invention, to minimize the generation of dust during use of the blasting media.

Turning now to FIGS. 5 and 6, an improved apparatus for conveying the blasting media, according to present invention, will now be discussed in detail. The recycled fiber media 38 is placed in a fiber media hopper or container 40. The fiber media is conveyed, via a conduit 44, to first end of an auger device 42. Virgin fiber media 46 with an adhesive or resin already applied thereto such that the adhesive or resin is in a tacky state, is placed within a container 47 and conveyed, via a conduit 48, to a second end of the auger device 42. One or more abrasive component(s) 6, polishing component(s) 8, and/or absorptive component(s) 10 may be previously mixed with the virgin fiber media 46 having an adhesive or resin applied thereto or may be dispensed together with the virgin fiber media 46. Alternatively, the abrasive component(s) 6, the polishing component(s) 8 and/or the absorptive component(s) 10 may be dispensed separately via a component dispensing device 62. The virgin fiber media/adhesive 46 is combined with the recycled fiber media in a central region of the auger device 42. A supply of moisture or steam 50 is provided by a primary steam source 51, via a conduit 52, to the central area of the auger device 42. The auger device 42 discharges the mixture from the central region into a first end of a discharge conduit 54. Through a series of paddles or other members shown diagrammatically as 66 the media is broken up into smaller particles suitable for cleaning or otherwise treating the surface. A supply of pressurized fluid, such as pressurized air at a pressure of approximately 100 psi, is attached to the second end of the discharge conduit 54 for conveying the fiber media toward the charged nozzle 56. The mixture is conveyed by the discharge conduit 54 into a discharge nozzle 56 connected to the second end of discharge conduit 54.

If desired, a prepolymer may be supplied to the auger device 42, by a prepolymer dispenser 63, and allowed to react with the supplied materials. As the virgin fiber media/adhesive 46, the steam 50 and the recycled fiber media 38 flow through the discharge conduit 54 they react and combined with one another. The series of paddles or other members 66 assist with breaking up the combined particles into smaller particles suitable for cleaning and/or treating the surface. The fiber media, which discharges from the nozzle 56, is directed by an operator manipulating the nozzle 56, against a desired surface S to provide treatment thereof. In order to minimize the amount of dusting of the media, a secondary supply of steam 57 provided by a secondary steam source 58, via a conduit 60, can be supplied to the nozzle 56. This additional steam 57 further assists with minimizing the generation of dust created as the fiber media impacts against the surface S being treated. A suitable nozzle 56 for discharging the fiber media is manufactured by Empire Manufacturing of Langhorn, Pa. The steam is typically supplied at a relatively high pressure, e.g. 100 psi, and a suitable steam generator for either or both the primary and the secondary steam sources 51, 58, is manufactured by Electristeam of Alexandria, Va. If desired, the steam 57 from the secondary steam source 58 may be combined with a degreasing chemical, component or some other additive which further assists with cleaning and/or treating of the desired surface. The amount of steam applied to the fiber media, either by the primary steam source 51 or the secondary steam source 58 is sufficient to allow reaction of the prepolymer (if added) but not sufficient to completely saturate the fiber media. The moisture added to the fiber media typically evaporates within a few minutes following the medias impact against the surface S being treated.

Once the blasting media has been cycled through the blasting equipment, it is collected by a vacuuming, sweeping or some other form of collection and placed in a fiber media container 40. Once the blasting media has been cycled a sufficient number of times, e.g. 2 to 9 blasting cycles, so that the effectiveness of the blasting media is substantially reduced, the blasting media is regenerated. The steps for regenerating the blasting media will now be described in detail with references to FIG. 7.

Figure 7:
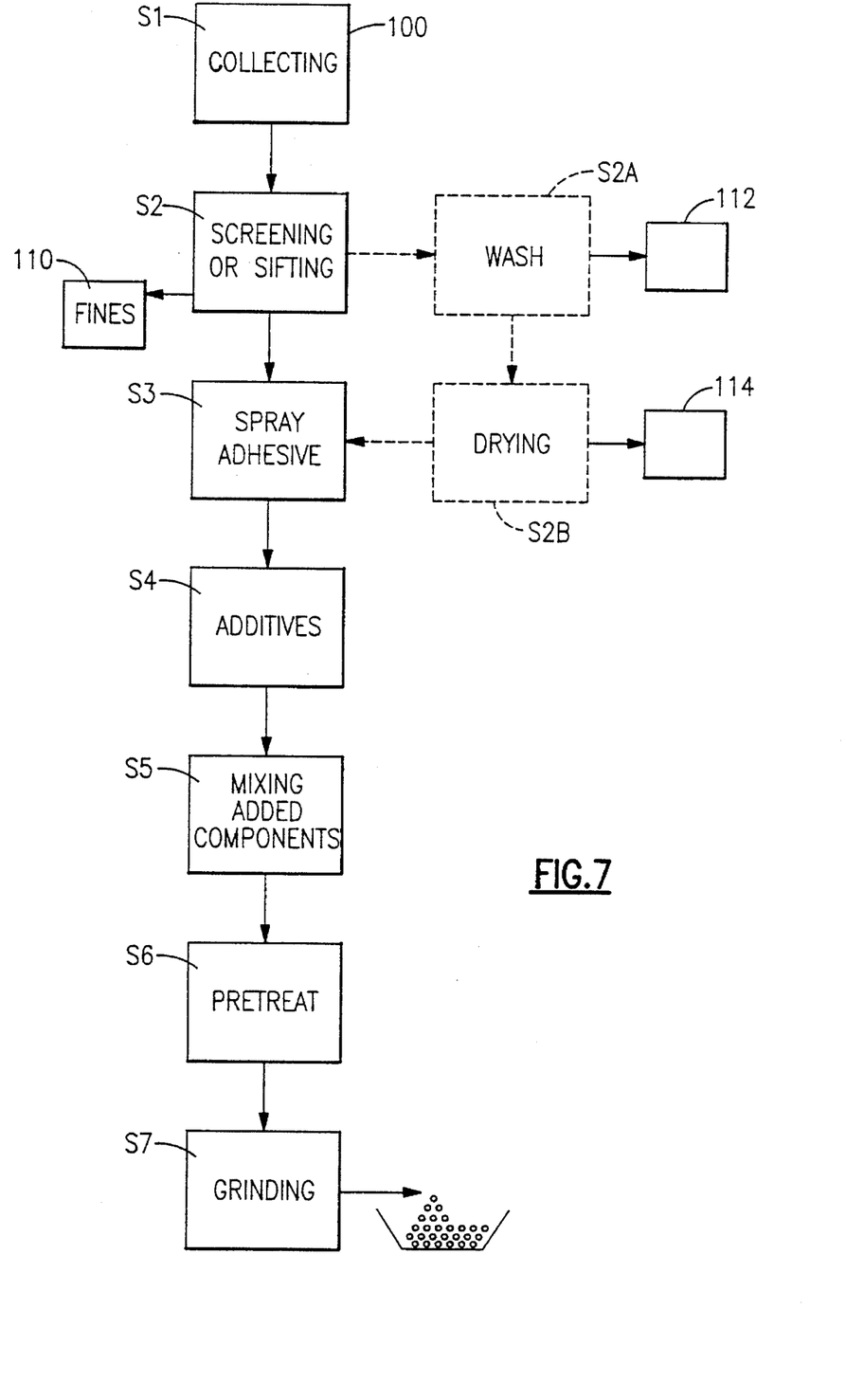
FIG. 7 is a diagrammatic block diagram showing one embodiment for collecting and recycling the fiber media.

The used blasting media is collected (step S1), by a suitable collection means 100. One such suitable collection means would, for example, be an operator sweeping the media particles into a pile and collecting the same with a dust pan or, preferably, using some sort of vacuum device to suck up all of the media particles 3. Once the media particles are collected, they can be either screened or sifted (step S2) to separate the small particles, fines and other contaminates and debris 110 from the recyclable blasting media. If desired, the screening step can be replaced or used in combination with a washing step (step S2A) to wash away and/or dissolve any matter that may be soluble in water or some other desired cleansing solution 112. If a washing step is employed, the washed media is typically air dried or squeezed (step S2B) after the washing step to remove any residual liquid and/or moisture 114.

Next, the cleaned fiber media is sprayed with additional adhesive and/or binder (step S3) and, once the additional binder or adhesive is sufficiently tacky, at least one of an additional abrasive and/or polishing component(s) and, if necessary, additional fibrous carrier component is added (step S4). Additional prepolymer may be also added during this step or in a subsequent step (between step S4 and S5). The combined media is then thoroughly mixed (step S5) to achieve a uniform mixture of the added and recycled components. Thereafter, the blasting media is ground (step S7) by suitable grinding equipment, such as a grinder manufactured by Nelmor Plastic Machinery of Nuxbridge, Mass. (model #G1012M1), into a plurality of granules of a desired particle size, each granules comprising a prepolymer, if added, and a plurality of abrasive, polishing and/or absorptive component bonded to carrier component. The size of the granules is selected according to the blasting application for which the particles will be used. If desired, the recycled fiber media may be pretreated, e.g. soaked or sprayed, with a grease cutting solution or some other surface cleaning or treating chemical or composition, during a pretreatment step S6, to assist the blasting media with treating the desired surface.

It is possible to use an air washer to clean the collected blasting media (step S2). One such suitable air washer is manufacturer by Invincible Air Flow Systems of Dover, Ohio (model no. 700-10). It is also possible, depending on the type of debris or abrasive material used, to use a magnetic separator to separate the fines, the debris and the contaminates from the recyclable composite media material. A suitable magnetic separator is manufactured by Eriez Magnetics Inc. of Erie, Pa.

By recycling and regenerating most of the blasting media, a substantial cost savings in the amount of material which must be properly disposed of is achieved. Thus, the recyclable blasting media according to the present invention is beneficial to the environment in general.

The abrasive component may be present in a varied range of proportions in relation to the prepolymer. Generally the percentage of abrasive to total composition can vary from 1% to over 90%, more preferably in the 70 to 90% range. The abrasive is much lower in cost and higher in specific gravity so that its use at the highest level of addition is important in general cost as well as density. The particulate abrasive is preferably a water insoluble, oh group mineral, such as sand, quartz, garnet, Wollastonite, carborundum diatomaceous earth, gypsum, etc.

A preferred abrasive is garnet for harder substrates and Wollastonite for softer substrates or minimal abrasiveness. Both are available from NYCO in New York.

Bactericide or fungicide can also be included in the medium to prevent bacterial or mold growth. The interpolymer media of the invention can be used to clean oil or contaminants from industrial equipment such as in machine shops, blow molds, paper mills, ducts, manufacturing plants, paint, restaurants etc. Oil contaminated rocks can be cleaned with vacuuming of the oil-soaked medium. Thus the material is useful for environmental cleaning, such as oil spills.

The cleaning media of the invention can be reused. The fiber network appears to hold the grease or contaminant. In water the granules sink to the bottom while the grease, oil, etc., is released from the fiber network of the media and rises to the top. The oil or grease can be skimmed off so that only a small volume of contaminant needs to be properly disposed.

Since certain changes may be made in the above without departing from the spirit and scope of the invention herein involved, it is intended that all matter contained in the above description or shown in the accompanying drawings shall be interpreted merely as examples illustrating the inventive concept herein and shall not be construed as limiting the invention.

Wherefore, we claim:

1. A solid, granulated fiber blasting media comprising a plurality of individual discrete granulated particles for use in treating a surface to remove undesired contaminants therefrom, each discrete granulated particle of said media comprising:

a carrier component having a lattice structure formed by a plurality of interconnected fibrous strands;

a plurality of discrete particles of at least one of an abrasive and a polishing component;

an adhesive component, being carried by said carrier component, to attach said plurality of discrete particles of at least one of the abrasive and the polishing component to said carrier component; and said lattice structure facilitating contact of said plurality of discrete particles of at least one of the abrasive and the polishing component with a surface to be treated while resisting wear of said carrier component, during use, wherein said carrier component remains substantially intact after numerous blasting cycles.

2. A fibrous blasting media according to claim 1, wherein each said discrete granulated particle of media is sized to be carried by a gaseous stream through suitable blasting equipment and said media includes a plurality of discrete particles of both the abrasive and the polishing components.

3. A fibrous blasting media according to claim 1, wherein each said individual discrete granulated particle includes an absorptive prepolymer component.

4. A fibrous blasting media according to claim 1, wherein said carrier component has a density less than the density of said at least one of the abrasive and the polishing component.

5. A fibrous blasting media according to claim 1, wherein said carrier component is selected so as to absorb a substantial portion of the energy generated, as the fiber media particle impacts against the surface to be cleaned, thereby limiting rebound of the fiber media during use.

6. A fibrous blasting media according to claim 1, wherein said lattice structure of said carrier component facilitates spacing of adjacent discrete particles from one another.

7. A fibrous blasting media according to claim 1, wherein said plurality of discrete particles of at least one of the abrasive and the polishing component has a mesh size of from about 20 to about 80; and said fibrous blasting media has an average length of from about an 1/32 inch to about 2 inches.

8. A method of forming a solid, granulated fiber blasting media comprising a plurality of individual discrete granulated particles for use in treating a surface to remove undesired contaminants therefrom, said method comprising the steps of:

providing a carrier component having a lattice structure comprising a plurality of interconnected strands of fibrous material;

applying an adhesive component to said carrier component;

applying a plurality of discrete particles of at least one of an abrasive and a polishing component to said carrier component whereby said lattice structure facilitates contact of said plurality of discrete particles of at least one of the abrasive and the polishing component with a surface to be treated while resisting wear of said carrier component, and wherein said carrier component remains substantially intact after numerous blasting cycles.

9. A method according to claim 8, further comprising the step of selecting the carrier component so as to wear at a rate slower than the rate of wear of the abrasive and the polishing components.

10. A method according to claim 8, further comprising the step of sizing said fibrous blasting media to have an average length of from about an 1/32 inch to about 2 inches; and Wherein said adhesive is selected from at least one of an adhesive and a resin.

11. A method according to claim 8, further comprising the steps of:

collecting the fiber blasting media, having a lattice structure, after at least one blasting cycle;

adding at least one of additional adhesive component, additional abrasive component, additional polishing component and additional carrier component to the collected fiber media; and forming the mixture of the collected fibrous blasting media and said at least one of the additional adhesive component, abrasive component, polishing component and carrier component into a plurality of granules each containing a plurality of discrete particles of at least one of the abrasive and the polishing component attached to said carrier component by said adhesive component so that said lattice structure facilitates contact of said plurality of discrete particles of at least one of the abrasive and the polishing component with a surface to be treated while resisting wear of said carrier component, during use, so that said carrier component remains substantially intact after numerous blasting cycles.

12. A method according to claim 11, further comprising the step of washing, in a washing device, the collected fibrous blasting media with a cleaning solution prior to the forming step.

13. A method of according to claim 12, further comprising the step of removing moisture from the washed fibrous blasting media, with a moisture removing mechanism, prior to the forming step.

14. A method according to claim 11, further comprising the step of cleaning the collected fibrous blasting media, with a cleaning device, prior to the forming step.

15. A method according to claim 11, further comprising the step of screening the collected fibrous blasting media following the collecting step.

16. A method according to claim 11, wherein said forming step comprises the step of mixing additional adhesive, abrasive and polishing components with the collected fiber media.

17. A method according to claim 11, further comprising the step of thoroughly mixing the fiber media to form a uniform mixture thereof prior to forming the mixture into a plurality of granules.

18. A method according to claim 11, further comprising the step of adding an absorptive prepolymer component to said fiber media prior to forming the mixture into a plurality of granules.

19. A method according to claim 11, further comprising the steps of separating recyclable fiber media, with a separating device, from fines, debris and contaminates after the collecting step and prior to the forming step.

20. A method according to claim 8 further comprising the steps of:

adding at least one of moisture and water vapor to said blasting media thereby reducing the generation of dust created upon said blasting media impinging against a desired surface.

21. A method according to clam 20 wherein said at least one of moisture and water vapor is added just prior to use.

* * * * *